L. FOWLER & D. SMEDLY.
Improvement in Stump Extractor.
No. 132,273. Patented Oct. 15, 1872.
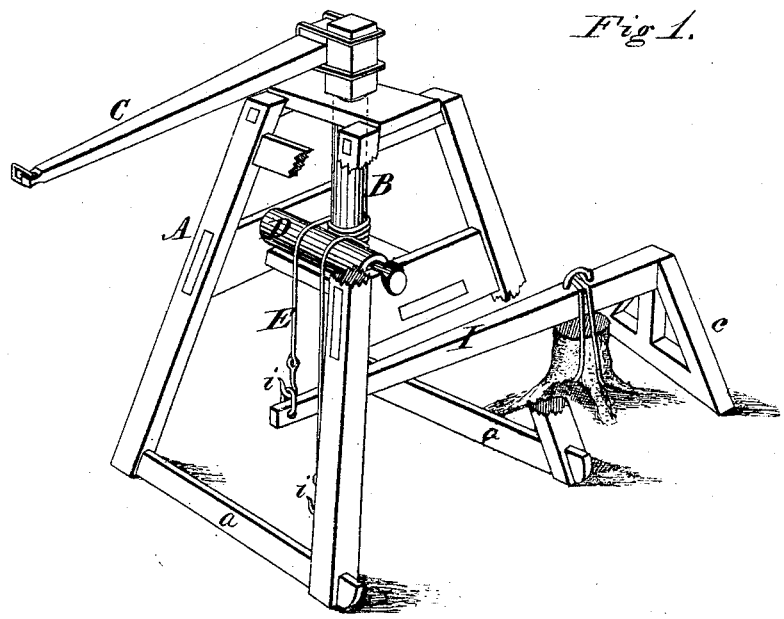
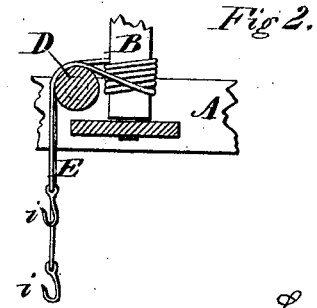
Witnesses.
Harry King.
H. W. Dodge.
Inventors,
Lofton Fowler
and
David Smedly
by
Dodge & Son
their attys

UNITED STATES PATENT OFFICE.

LOFTON FOWLER AND DAVID SMEDLY, OF RUSHVILLE, ILLINOIS.

IMPROVEMENT IN STUMP-EXTRACTORS.

Specification forming part of Letters Patent No. 132,273, dated October 15, 1872.

*To all whom it may concern:*

Be it known that we, LOFTON FOWLER and DAVID SMEDLY, of Rushville, in the county of Schuyler and State of Illinois, have invented certain improvements in Stump-Extracting Machines, of which the following is a specification, reference being had to the accompanying drawing.

Our invention relates to machines for extracting stumps, &c.; and consists in a peculiar construction and arrangement of a portable frame provided with a windlass and chain, and a lever to be connected to the stump and actuated by the windlass, as hereinafter more fully explained.

Figure 1 is a perspective view of our machine in operation, a portion of its frame being broken away in order to expose other parts to view; and Fig. 2 is a vertical cross-section through the top of the frame by the side of the windlass.

In constructing our machine we first build a strong upright frame, A, and mount its legs on runners $a$, so that it may be readily hauled about from place to place, as required. In the top of the frame we mount a vertical windlass or drum, B, and to the upper projecting end of the same attach a long sweep, C, which extends downward by the side of the frame, so that it may be operated by animal or manual power. Across the frame, by the side of the windlass or drum B, we mount a horizontal roller, D, as shown in both figures. Around the windlass we wind a chain or rope, E, and pass its ends off on opposite sides and down over the roller D, as shown, so that when the windlass is turned one end of the chain will be raised while the other is lowered. Having thus constructed the frame and windlass, we next provide a long and heavy lever or beam, I, and secure one of its ends rigidly to the top of a frame or support, $c$, which is constructed with a broad base, so as to prevent the lever from falling over sidewise. The opposite end of the lever or beam we provide with a strong ring or staple, and the ends of the chain E we provide with hooks $i$, to engage therewith.

When it is desired to remove a stump the lever I is placed in position across its top with the support $c$ resting on the ground by its side, as in Fig. 1. The stump is then securely connected to the lever by ropes or chains, and then the frame A hauled into position and one end of the chain hooked fast to the free end of the lever, as shown. If now the sweep be turned, it will wind the chain upon the drum and raise the end of the lever, and thereby tear the stump from its seat. By using the long lever and operating it by the windlass and sweep, we obtain sufficient power to remove the largest and most refractory stumps. The construction of the machine enables it to withstand the most severe strain without danger of breakage or disarrangement, and permits of its being built at a very low cost. The machine, in addition to being powerful and cheap, is exceedingly simple and easy to manage, and may be readily transported from one place to another. By arranging the chain so that its ends ascend and descend, alternately, as described, we always have one end lowered in position for use, and thus obviate the necessity of turning the windlass backward after each operation in order to unwind the chain. The amount of leverage obtained and the quickness with which the stump is moved, is of course governed by the distance at which the base or support $c$ is placed from the stump.

We are aware that a windlass very similar to that used by us has been heretofore employed for removing stumps by attaching its chain directly thereto; and we are also aware that levers have been applied and operated in various ways for removing stumps. We do not, therefore, claim the windlass nor the lever, by itself; nor do we claim, broadly, the combination of a lever and a windlass for the purpose; but What we do claim is—

The combination of the frame A, mounted on runners $a$, and provided with the windlass B, chain E, roller D, and sweep C, with the lever I provided with the base or support $c$, said parts being constructed and arranged as described.

his
LOFTON + FOWLER.
mark.
DAVID SMEDLY.

Witnesses:
JOHN J. SMEDLY,
GEORGE H. NELSON.